Patented Dec. 24, 1940

2,226,391

UNITED STATES PATENT OFFICE 2,226,391

METHOD OF MANUFACTURING BASIC LEAD TRINITRO-M-CRESOLATE

Leon Rubenstein, Saltcoats, Scotland, assignor to Imperial Chemical Industries Limited, a corporation of Great Britain No Drawing. Application May 9, 1938, Serial No. 206,898. In Great Britain May 13, 1937

7 Claims. (Cl. 260—435)

The present invention relates to an improved method for the preparation of basic lead trinitro-m-cresolates.

Basic lead trinitro-m-cresolates have applications in explosives technology; for instance, as the readily-ignitable ingredient in fusebead beads.

The method hitherto followed for the manufacture of basic lead trinitro-m-cresolates has consisted in the addition of a solution of lead nitrate to a solution made by dissolving trinitro-m-cresol in excess of sodium hydroxide solution; the excess of sodium hydroxide over that required to form the sodium trinitro-m-cresolate corresponding to the excess of lead nitrate over that required to undergo metathesis with the sodium trinitro-m-cresolate. I have found, however, that under these conditions the average lead content of the trinitro-m-cresolate precipitated is higher, and the gross yield is lower, than would be expected from the conversion of the reagents according to the general equation

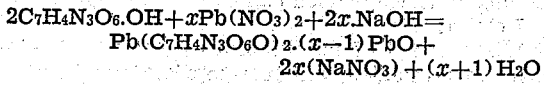

A proportion of the normal lead trinitro-m-cresolate is also formed, and remains dissolved in the solution. Minor variations in the working conditions in successive batches, moreover, cause irregular yields of basic lead trinitro-m-cresolate having wide and indefinite variations in composition, and showing variations in their sensitiveness to ignition by an electrical current, which is obviously undesirable.

This invention has as an object to devise an improved method of manufacturing basic lead trinitro-m-cresolates. A further object is to devise a method of manufacturing basic lead trinitro-m-cresolates which will obviate those disadvantages of known processes which are mentioned above. A still further object is to devise a method of manufacturing basic lead trinitro-m-cresolates having a lead content closely corresponding to the theoretical quantity. A further object is to provide and to devise methods of manufacturing basic lead trinitro-m-cresolates of predetermined composition. Further objects will appear hereinafter. These objects are accomplished by the following invention.

I have found that I can achieve these objects if I effect a reaction between a soluble lead salt, a free base, and a normal trinitro-m-cresolate; the lead salt and the free base being added to the trinitro-m-cresolate at controlled rates, so that equal aliquot parts of each are added in equal times.

In carrying out the invention, I prefer to prepare the solution of the normal trinitro-m-cresolate separately, and then to run the solutions of lead salt and free base into it simultaneously in the prescribed proportions. I may also run the three solutions simultaneously with agitation into a precipitating bath. The solution is agitated during the addition of the aqueous solution of the base and the solution of the lead salt used, and should be stirred for a short while afterwards. The lead trinitro-m-cresolate, which filters out easily, may then be purified in known manner, e. g. by washing successively with hot water, acetone, and amyl acetate, and a yield exceeding 90% of the theoretical may be expected.

This invention is further illustrated by the following examples, in which the terms "dibasic salt" and "tribasic salt" refer to compounds of the normal lead trinitro-m-cresolate with two and three molecular proportions respectively of lead monoxide.

Example 1

This example relates to the preparation of tribasic lead trinitro-m-cresolate. To an aqueous solution containing 4.05 gm. trinitro-m-cresol and 0.67 gm. sodium hydroxide made up with water to 200 cc. and heated to 46° C. there was added during 3 minutes, 20 seconds, from graduated delivery vessels running at equal rates, 110 cc. of an aqueous solution containing 11 gm. lead nitrate and 110 cc. of a solution containing 2 gm. of sodium hydroxide, the temperature being maintained at 46° C. The solution was stirred during the addition, and for 5 minutes after the addition was complete. The lead salt was isolated by decantation of the mother liquor, filtration, washing with water and drying at a temperature of 30–40° C. The yield was 11.1 gms. of a product having a lead content of 60.2%. The theoretical lead content for the tribasic salt is 60.9%.

Example 2

This example also relates to the preparation of the tribasic trinitro cresolate. To an aqueous solution containing 9.72 gm. trinitro-m-cresol and 1.6 gm. sodium hydroxide made up with distilled water to 500 cc. and heated to 43° C. there was added during 4 minutes, from graduated delivery vessels running at equal rates, 265 cc. of an aqueous solution containing 26.5 gm. lead nitrate and 265 cc. of a solution containing 4.8 gm. sodium hydroxide, the temperature being maintained at 43° C. The solution was agitated during the addition, and for 10 minutes after the addition was complete. The lead salt is isolated by decantation of the mother liquor, filtration, washing with water, then with acetone and finally with amyl acetate, and drying at a temperature of 30°–40° C. The yield was 26.5 gm. of a product containing 59.7% lead.

*Example 3*

This example relates to the preparation of a dibasic trinitro cresolate. To an aqueous solution containing 14.58 gm. trinitro-m-cresol and 2.4 gm. sodium hydroxide made up with water to 600 cc. and heated to 55° C. there was added over 4 minutes from graduated delivery vessels running at equal rates 300 cc. of an aqueous solution containing 29.8 gm. lead nitrate and 300 cc. of a solution containing 4.8 gm. sodium hydroxide; the temperature being maintained at 55° C. The solution was agitated during the addition, and for 10 minutes after the addition was complete. The lead trinitro cresolate was isolated by decantation of the mother liquor, filtration, washing with water, then with acetone and finally with amyl acetate, and drying at a temperature of 30–40° C. The yield was 32.7 gm. of a product containing 53.8% lead. The theoretical lead content for the dibasic lead trinitro cresolate was 54.6%.

*Example 4*

This example relates to the preparation of a dibasic trinitro cresolate. The relative proportions of the reagents employed were the same as in Example 3, but only one-third of the amount of each was employed. The temperature was maintained at 45° C. during the addition of the lead nitrate solution and the solution of the sodium hydroxide was added with it at the same rate; but the period during which these quantities were added to the solution of the sodium trinitro cresolate of trinitro-m-cresol remained at 4 minutes. The solution was agitated during this addition, and for a period of 10 minutes thereafter. A product closely similar to that obtained from Example 3 was isolated.

*Example 5*

This example illustrates the use of the tribasic lead compound of trinitro-m-cresol in the manufacture of high-tension fuseheads for electric blasting detonators.

High-tension fusehead blanks were dipped in a suspension of 73% basic lead trinitro-m-cresolate as produced according to Example 2, and 27% graphite, in a 2½% solution of nitrocellulose in the proportions 0.34 cc. solution per gram of total solids. When dried, the fuseheads were given a second dip in a suspension of basic lead trinitro-m-cresolate alone in nitrocellulose solution, and again dried. The third and fourth dips were the customary charcoal/potassium chlorate dip and final collodion dip respectively.

When tested for ignition properties, the fuseheads gave very powerful ignitions. The firing voltage (at which no failures occurred in twenty successive trials) was 33–35 volts, which corresponds to the firing voltage of copper acetylide.

It is rendered apparent by the foregoing examples that it is possible according to the method of the present invention to manufacture basic lead trinitro-m-cresolates having a lead content approximating very closely to the theoretical quantity desired, for example, within 1% of the theoretical lead content for desired compounds.

Instead of the caustic soda used in the above examples, I could have used any other free base, such as caustic potash, baryta, ammonia, or lime. Instead of the lead nitrate, I could have used any other soluble lead salt, such as lead acetate. The formation of the compound of the base with trinitro cresol enables the latter to dissolve in water. The solution may conveniently be heated to a temperature between 30° and 60° C., preferably about 45° C., and should be dilute; the maximum, minimum, and optimum proportions being 3%, 1%, and 2%, respectively, in the case of the basic and trinitro-m-cresolate solutions, and 15%, 5%, and 10% in the case of the lead compound.

With regard to the alkalinity of the reaction mass, this will preferably lie wholly within a narrow range. The solutions of sodium trinitrocresolate that I prefer to use are of less than 3% concentration, and are practically saturated. The maximum alkalinity cannot, therefore, exceed that of the 0.3%–0.4% alkali present, while the minimum is that of a saturated solution of lead hydroxide.

This invention is a valuable advance in the art, as by its use I can obtain excellent yields of basic lead trinitro-m-cresolates closely corresponding to that required for the formulated compound, characterised by a high degree of chemical homogeneity, and also by constancy of physical properties of material prepared in a succession of batches.

As many apparently widely different embodiments of this invention may be made without departing from the spirit and scope thereof, it is to be understood that I do not limit myself to the specific embodiments thereof except as defined in the appended claims.

I claim:

1. A method of manufacturing basic lead trinitro-m-cresolates which comprises reacting a soluble lead salt, a free base, and a normal trinitro-m-cresolate of the said base, characterised in that the lead salt and the free base are added to the trinitrocresolate at controlled rates, so that approximately equal aliquot parts of each are added in equal times.

2. A method of manufacturing basic lead trinitro-m-cresolates which comprises reacting a soluble lead salt, a free base, and a normal trinitro-m-cresolate of the said base, characterised in that the three reagents are brought together at controlled rates, so that approximately equal aliquot parts of each are brought together in equal times.

3. A method as claimed in claim 1, in which the soluble lead salt is lead nitrate.

4. A method as claimed in claim 1, in which the free base is caustic soda.

5. A method as claimed in claim 1, in which the soluble lead salt is lead acetate.

6. A method as claimed in claim 1, carried out at a temperature between 30° and 60° C.

7. A method as claimed in claim 1, carried out at approximately 45° C.

LEON RUBENSTEIN.